(12) United States Patent
Michel et al.

(10) Patent No.: US 9,929,795 B2
(45) Date of Patent: Mar. 27, 2018

(54) TELECOMMUNICATION NETWORK ARCHITECTURE

(71) Applicant: THALES, Courbevoie (FR)

(72) Inventors: Cyril Michel, Toulouse (FR); Nicolas Chuberre, Pibrac (FR)

(73) Assignee: Thales, Courbevoie (FR)

( * ) Notice: Subject to any disclaimer, the term of this patent is extended or adjusted under 35 U.S.C. 154(b) by 12 days.

(21) Appl. No.: 14/880,855

(22) Filed: Oct. 12, 2015

(65) Prior Publication Data

US 2016/0105232 A1    Apr. 14, 2016

(30) Foreign Application Priority Data

Oct. 14, 2014  (FR) ..................... 14 02315

(51) Int. Cl.
*H04L 12/26* (2006.01)
*H04B 7/185* (2006.01)
*H04L 29/08* (2006.01)

(52) U.S. Cl.
CPC ....... *H04B 7/1851* (2013.01); *H04B 7/18526* (2013.01); *H04B 7/18582* (2013.01); *H04L 67/2842* (2013.01)

(58) Field of Classification Search
CPC .... H04B 7/216; H04B 7/1851; H04B 7/2041; H04B 7/18584; H04B 7/18526; H04B 7/18582; H04L 12/2801; H04L 47/14; H04L 67/2842; H04W 16/28

USPC ............... 370/235, 316, 229, 230; 342/367; 455/12.1; 725/63, 36

See application file for complete search history.

(56) References Cited

U.S. PATENT DOCUMENTS

| | | | |
|---|---|---|---|
| 5,896,558 A * | 4/1999 | Wiedeman | H04B 7/18515 455/12.1 |
| 9,455,777 B1 * | 9/2016 | Johnson | H04B 7/2041 |
| 2002/0031102 A1 * | 3/2002 | Wiedeman | H04B 7/18584 370/316 |
| 2002/0077099 A1 | 6/2002 | Laprade | |
| 2005/0210121 A1 | 9/2005 | Taylor et al. | |
| 2009/0037950 A1 * | 2/2009 | Ching | H04H 20/103 725/36 |
| 2010/0017826 A1 * | 1/2010 | Fitting | H04L 12/2801 725/65 |
| 2015/0236779 A1 * | 8/2015 | Jalali | H04W 16/28 342/367 |

FOREIGN PATENT DOCUMENTS

WO    2010/081160 A2    7/2010

* cited by examiner

*Primary Examiner* — Harun Chowdhury
(74) *Attorney, Agent, or Firm* — Baker & Hostetler LLP

(57) ABSTRACT

A device and method for the exchange of digital information between one or more content providers and one or more users, in which microcaches and nanocaches are used to store the contents of the information to be broadcast to users at their request and to provide real time services.

19 Claims, 3 Drawing Sheets

TELECOMMUNICATION NETWORK ARCHITECTURE

CROSS-REFERENCE TO RELATED APPLICATION

This application claims priority to foreign French patent application No. FR 1402315, filed on Oct. 14, 2014, the disclosure of which is incorporated by reference in its entirety.

TECHNICAL FIELD

The invention concerns a system architecture for a network for transmission of digital information. It applies to the exchange of content conveyed via the Internet and notably concerns satellite broadcasting geostationary satellites and the transmission of data by non-geostationary communication satellites.

BACKGROUND

The evolution of the richness of content broadcast by the Internet combined with an ever increasing quality of experience of users, notably in terms of instantaneity, whether this refers to the consultation of content on line or to games played by players who are far away form each other, is leading content providers and network operators to locate content remotely and to duplicate it as close as possible to users, when that makes sense.

The expansion of the Internet has led in recent years to an explosion in traffic in terms of the richness of the data transported, essentially because the streams concerned are mass market video programs, for example Netflix, Youtube, etc. The transit networks (intercontinental fibres, national networks), the backhauling networks and the access or "local loop" networks are saturated. This causes loss of packets by the routers and the necessity to retransmit the corresponding programs (television programs or video) as well as the other streams that are also impacted as a consequence and in an undifferentiated manner. The increase in the transfer time caused by these retransmissions, because of the reduced performance of the networks, leads to a deterioration of the quality as perceived by users.

To attempt to solve these problems, network operators have deployed infrastructures offering better performance in terms of data rate and making it possible to transport high volumes, but this is an endless race between increasing the capacity of the networks and the increasing richness of the content in transit over the same networks; hardly have new infrastructures been deployed than new content encoding standards become available (SDTV, HDTV, 4K, 8K, etc.).

An alternative approach has therefore been proposed by Internet players using telecommunication networks in order to offer an improved quality of experience (QoE) to end users (content access delay, content richness): dedicated storage, management, content access and user request management architectures known as content delivery network (CDN) architectures, by duplication of the content in "caches" located as near users as possible, make it possible to reduce contention in the transit networks and therefore to reduce the delay in accessing that content.

These CDN have been installed in terrestrial networks and in the infrastructure networks of telecommunication operators.

Broadband terrestrial infrastructures cannot reach all subscribers, however, notably for economic reasons, the cost of deployment of optical fibres, ADSL copper networks or fourth generation (4G) or fifth generation (5G) terrestrial wireless networks potentially becoming unacceptable if the subscriber density falls too low.

Some players have therefore proposed in the past or more recently the deployment of constellations of satellites in non-geostationary orbit (NGSO) i.e. in low Earth orbit at between 500 and 2000 km altitude and in medium Earth orbit at between 6000 and 20 000 km altitude. This type of solution offers a propagation delay compatible with those encountered in terrestrial networks, i.e. a few tens of milliseconds (ms) for the lowest orbits. On the other hand, the deployment of such a constellation requires use of several tens of satellites (e.g. in the O3bNetworks, Globalstar or Iridium, Skybridge satellite networks) to several hundred satellites (e.g. Teledesic or WorldVu) in order to guarantee continuity of service in the inhabited areas of the terrestrial globe. Moreover, a satellite in low earth orbit offers a limited capacity compared to a geostationary satellite in a comparable point to point configuration, but makes it possible to limit the cost of the space infrastructure by launching a plurality of satellites on each launch vehicle. Because of their altitude and low latency, this type of satellite contributes to an efficient use of the telecommunication network, with performance comparable to that of terrestrial networks.

Geostationary Earth Orbit (GEO) satellites (orbiting at a distance of 35 786 km in the equatorial plane of the Earth), for their part, have the advantage of covering a large area of the surface of the Earth (up to ⅓ of that surface); the same content can therefore be received simultaneously by several hundred thousand users, even millions of users, thereby reducing the cost of transmission of the same content in the same proportion. However, the transmission delay of a geostationary satellite (more than 500 ms between two points on the Earth for a round trip) is very much greater than the delays encountered in terrestrial networks and incompatible with real time use and with the quality of experience now encountered in terrestrial networks (a few tens of milliseconds), when the content must be downloaded via a geostationary network of this kind in an interactive context (for example when consulting a Web page via a browser). Moreover, in order to circumvent this obstacle, dedicated protocols or devices (for example the Performance Enhancement Proxy (PEP) protocol) must be used by the satellite network operators in order to integrate their solutions into terrestrial networks, often to the detriment of security.

US patent 2002/0031102 describes a system using the DSN service to enable a user to access the Internet. D1 uses a dynamic cache to store the most requested IP addresses.

The patent application WO 2010081160 describes a system and a method making it possible to optimize communication performance in a WEB context.

In this document, the term "CDN" designates a set of servers connected in a network that cooperate to make content or data available to users via caches, a microcache is a cache situated at the level of a geostationary or non-geostationary satellite network, a nanocache is a cache situated at a user access point closest to a user (at the level of the user terminal of the satellite network itself, serving a local loop to which a set of users are connected—as in a village or a small business, for example—or serving a single user—as in a home, for example). The term "cache" is well known to the person skilled in the art and is not explained further here.

The expression "end user" refers to a user accessing a data content or transferring data to the network to exchange of data with other users via a terminal intended to interact with a telecommunication network, terrestrial or otherwise.

The introductory description indicates that the altitude criterion is essential for delivering a service enabling a network with non-terrestrial infrastructures to be integrated into terrestrial networks, the propagation delay being crucial. Types of platform other than non-geostationary satellites meet this criterion: drones (non-piloted aircraft) and stratosphere balloons (stabilized balloons). Hereinafter, the expression "vehicle in low Earth orbit" therefore refers to a non-geostationary satellite, a stratosphere balloon, a drone, for example. In the remainder of the patent the NGSO terminology therefore embraces the expression "vehicle in low Earth orbit".

An NGSO network is a telecommunication network made up of terrestrial user stations, terrestrial access stations connected to the telecommunication infrastructures and to a set of NGSO vehicles. Terrestrial user stations are interconnected to the access stations via NGSO vehicles.

SUMMARY OF THE INVENTION

The invention is notably based on the use of an architecture combining geostationary (GEO) satellites to broadcast the most popular or anticipated content and NGSO vehicles for access to telecommunication services in real time or to content not stored elsewhere following distribution by the GEO satellites. The most consulted data is deposited as close as possible to users, in a nanocache, which leads to faster access to this data. The data stored in this nanocache is accessed with a minimum response time by users if the anticipation is correct. If the anticipation is not correct, a second level of cache, or microcache, storing all the content from geostationary satellites without distinction, is possible via the NGSO network, therefore offering a level performance in terms of delay comparable to that of terrestrial networks. Real time services such as on-line games are offered via an NGSO network.

This architecture is therefore complementary to that of terrestrial networks in that a CDN operator can use it as a function of routing algorithms to obtain the best performance. The advantage of this solution is that it makes it possible to provide broadband services anywhere on the globe without the requirement to deploy collection or transit infrastructures. Performance is also guaranteed to users anywhere on the Earth.

The invention concerns a telecommunication system for the transmission of digital information between at least one content provider $F_1$, at least one set of users $U_i$, comprising at least the following elements:

- a first network $R_1$ of geostationary satellites comprising at least one first geostationary satellite $G_1$, at least one first access station $SAG_1$ connected to one or more content providers $F_i$, and at least one first geostationary satellite subscriber station $SG_2$ and at least one second geostationary satellite subscriber station $SG_1$,
- a second network $R_2$ of non-geostationary vehicles comprising at least one first network access station $SAN_1$, at least one first non-geostationary vehicle network user station $SN_1$, at least one first vehicle $NG_1$ in low earth orbit comprising means for the exchange of low-latency data between the first non-geostationary network access station and the first non-geostationary vehicle network user station,
- a local loop $B_1$ comprising one or more users $U_i$,
- a first nanocache $N_1$ connected to the subscriber station $SG_2$ of the geostationary network $R_1$ and adapted to store content from the content providers ($F_i$ with i at least equal to 1) as a function of the profile of the users, the first nanocache $N_1$ being also connected to the local loop $B_1$ and to the first subscriber station $SN_1$ of the second non-geostationary network $R_2$,
- a first microcache $M_1$ for the storage of content from the content provider or providers $F_1$ received via the subscriber station $SG_1$ of the first geostationary satellite $G_1$, the first microcache $M_1$ being also connected to the second non-geostationary network $R_2$ via access stations $SAN_1$, this connection of $M_1$ to $R_2$ being a direct connection, where appropriate via a terrestrial network $T_1$,
- at least one CDN cache ($CDN_1$) containing a routing algorithm adapted to determine a microcache to be used to find the content requested by a user that is not stored in a nanocache near the user.

The system may comprise means for managing the mobility of users subscribing at the level of the local networks.

The local loop $B_1$ is for example a terrestrial access network of WiFi, 4G, 5G of FTTH type.

A network of vehicles in low earth orbit may be a network of non-geostationary satellites.

The network of vehicles in low earth orbit comprises, for example, a stratosphere balloon or a drone or a combination of non-geostationary satellites, stratosphere balloons and drones, or a mixed combination of these three types of platforms (stratosphere balloons, drones or satellites).

In accordance with one embodiment, a user is connected to the networks via a WiFi local loop comprising a central mast equipped with a plurality of non-geostationary and geostationary subscriber terminals and solar panels.

In accordance with a variant embodiment, the GEO and NGSO networks operate in the same frequency bands in accordance with mutual protection principles, notably using the technique of avoidance of the geostationary arc by the NGSO network.

The invention also concerns a method for the exchange of digital information between one or more content providers and one or more users, and between a plurality of users, said digital information being transported across multiple telecommunication networks, characterized in that it comprises at least the following steps:

- a first content provider $F_1$ delivers its content into at least one first nanocache $N_1$ situated near the users and the nanocache stores some or all of the content received in accordance with predefined rules via a first GEO satellite network $R_1$,
- at the same time, the content provider delivers the content into at least one first microcache $M_1$ maintained by a first geostationary satellite network $R_1$, the first microcache storing all of the content issued by the content provider,
- the users $U_i$ consult the content stored in the first nanocache $N_1$,
- if the content requested by a user is present in the first nanocache $N_1$, then the first nanocache delivers that content to the user $U_i$,
- if the requested content is not present in the first nanocache $N_1$, then the content is looked for in another microcache, a request is sent across the loop $B_1$, via the first nanocache $N_1$, via the first subscriber station $SN_1$ of the network $R_2$, via the non-geostationary vehicles $NG_1$ and the access stations $SAN_1$, if the requested services are real time services, then the transaction is effected directly via the network $R_2$ from the loop $B_1$.

The request to search for the content in a microcache is possibly transmitted via a terrestrial network $T_1$.

The method uses non-terrestrial networks integrated into the Internet network for the exchange of data and the broadcasting of content.

BRIEF DESCRIPTION OF THE DRAWINGS

Other features and advantages of the present invention will become clearer on reading the description of embodiments given by way of nonlimiting example, with the appended drawings, in which.

DETAILED DESCRIPTION

In order to explain the invention better, the following description is given by way of illustration for the broadcasting of content conveyed via the Internet network.

Figure 1:
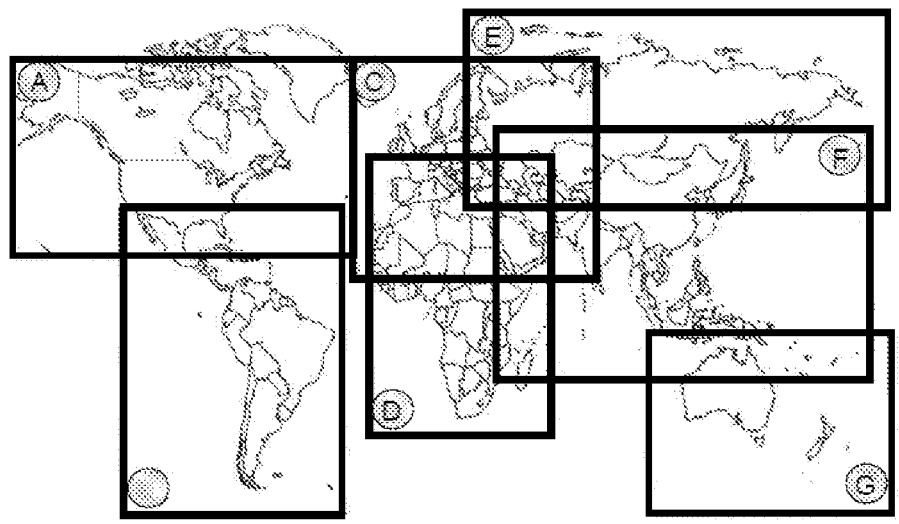
FIG. 1 is a representation of the world divided into regions.

FIG. 1 shows an example of the global organization of a content delivery network. The network is considered a global CDN. Each region A: North America, B: South America, C: Europe and Middle East, D: Africa and Southern Europe, E: Eurasia, F: Middle East and South-East Asia, G: Oceania is defined so that radio coverage can be provided by a geostationary satellite to service small receiver stations or user stations of the GEO network at any point within this area using a single power amplifier and a single antenna, a single signal broadcast at every point. Each of the areas is controlled by a regional CDN $R_A$, $R_B$, $R_C$, $R_D$ that is connected to the other CDN of the other areas via an inter-exchange CDN designated CDX (FIG. 2).

Figure 2:
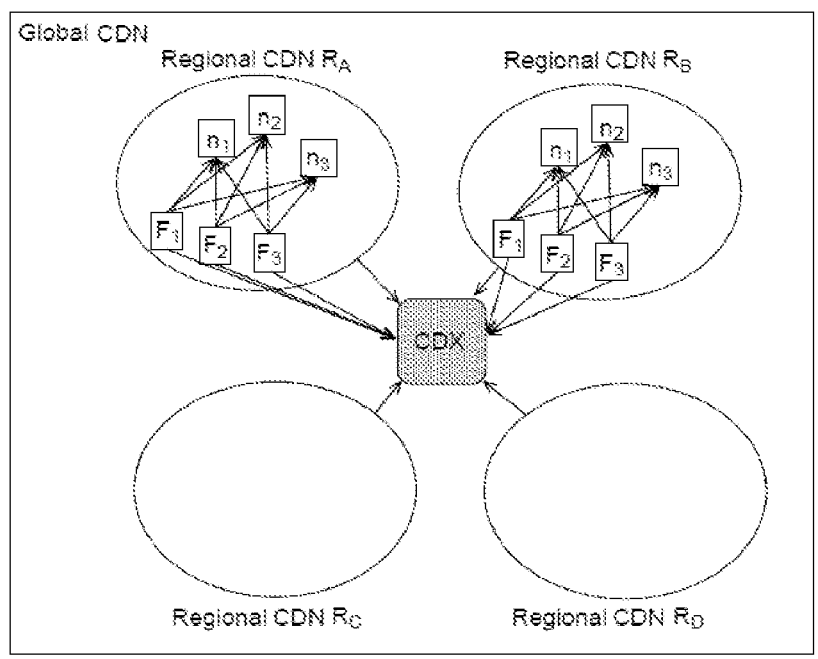
FIG. 2 is a representation of exchanges between a plurality of regional CDN (or regional cache zones)

FIG. 2 explains the control of the streams from the regional CDN in their respective area. In each of the areas, all the content providers ($F_j$) requiring to access the nanocaches $n_i$ of the users of the global CDN are coordinated by the regional CDN for regional users or by the other regional CDN. In order to have access to the nanocaches intended for a list of end users, the content providers employ the following procedure, for example:

Each content provider enters into a contract with each regional CDN in order to enable it to access the nanocaches of the end users. For example, the contract or approval entails complying with a charter on the tenor of the content, the neutrality of the network, respect for the rights of children, or the payment of a subscription, the maximum contractual volume per month, the management of authors' rights, etc.

When a content provider $F_j$ requires to send a new content to the nanocaches $n_i$ of the users, it sends a request to the regional controller. The regional controller validates access to the CDN network or not and authorizes the transmission to the nanocaches or a list of nanocaches. The latter acknowledge correct reception of the content in accordance with principles known to the person skilled in the art. If the content has not been transmitted correctly, retransmission is requested by the user.

The content is stored in each nanocache nearest a user. On each use of the content, a token is transmitted to the content provider and to the regional controller of the CDN in order to enable management of the rights to use the content.

Use of the content stored in the nanocaches could be managed as a function of contracts entered into with the content providers: at the request of users (potentially managed by an intermediate content "aggregator" for Web consultation, for example) or in broadcast mode (whether generalist or in accordance with a broadcast channel structure locally appropriate to each group of users or even to each user depending on their habits). There are therefore found in the nanocaches: television news, sporting events selected as a function of the preferences detected according to the users present in the local loop, locally adapted advertising sequences, in consultation for example, on-demand videos, daily, weekly, monthly, generalist or specialist press as a function of the requests or preferences of the population of the local loop.

One of the objectives of the invention is to transmit the content from a content provider via a geostationary satellite at the level of a nanocache of a set of users; the content (Cd) held in the nanocache is a function of the profiles of the end users and the content (Cr) rejected is that which does not match these profiles, management being done by the manager of the nanocache, this manager being located either in the nanocache or in the infrastructure of the CDN.

If a user wishes to consult a content (Cr) not held in a nanocache, that content (Cr) is transmitted via the NGSO network connected to a microcache situated at the level of an access station (also called a connection station) of the NGSO network. A routing algorithm of the regional CDN makes it possible to find the "best" microcache in the network, which will make it possible to provide the best performance in terms of content distribution: the routing algorithm having failed to identify the content in the nanocache, the next nearest cache will be the nearest microcache connected via the NGSO network via an access station.

Figure 3:
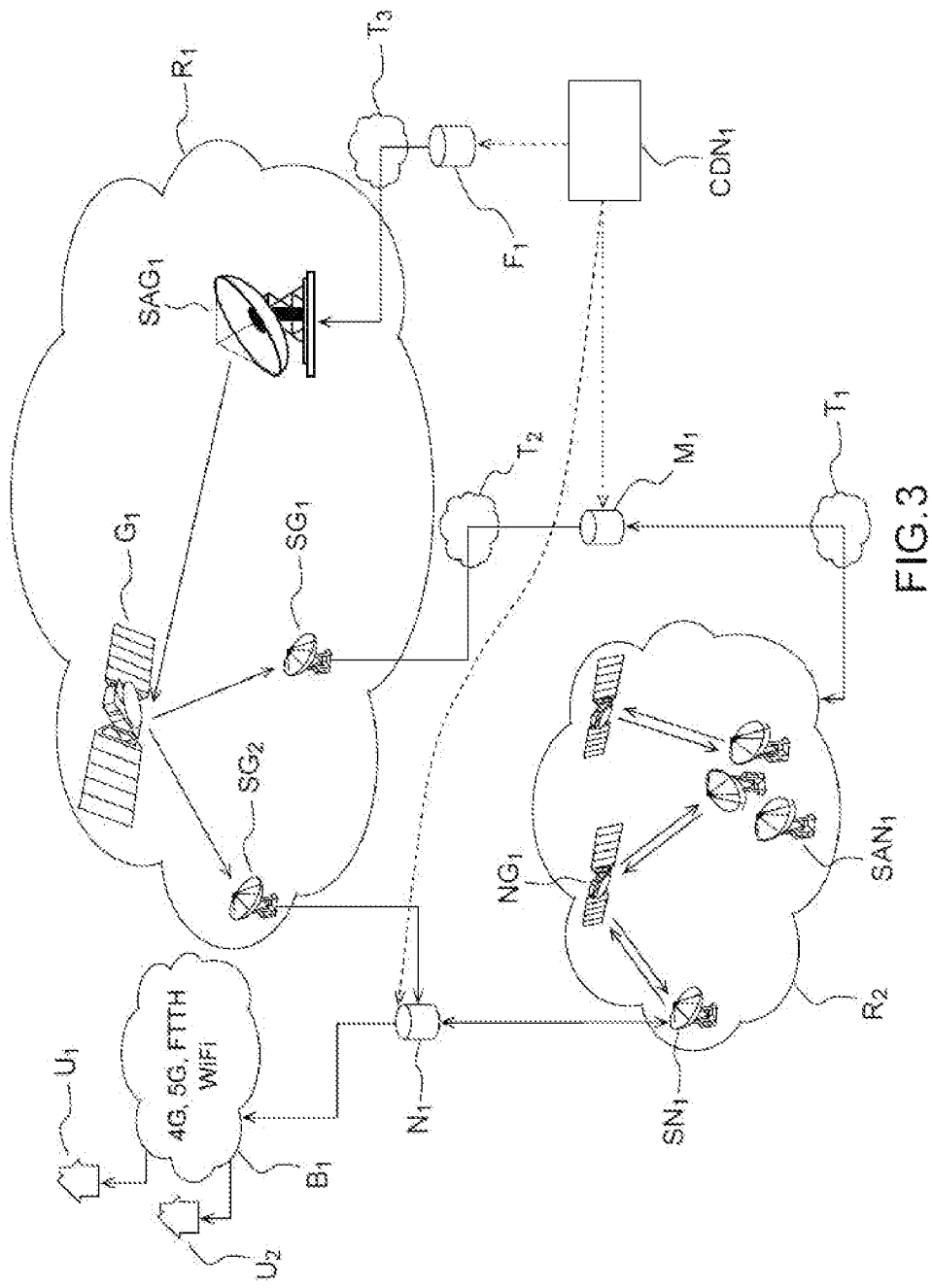
FIG. 3 is an example of an architecture in accordance with the invention.

FIG. 3 shows diagrammatically an example of an architecture for implementing the method in accordance with the invention.

A content provider $F_1$ accesses the geostationary satellite network $R_1$ via a geostationary network access station $SAG_1$. The content is broadcast over the broadcast region, notably to a subscriber station to the geostationary network $SG_1$ and a subscriber station to the geostationary network $SG_2$. The subscriber station $SG_1$ is connected to a microcache $M_1$ that stores all the content received from all the content providers. The geostationary network subscriber station $SG_1$, $SG_2$ is connected to a nanocache $N_1$ that stores content as a function of predefined rules. The nanocache $N_1$ is connected to a local loop $B_1$ that enables interconnection of the nanocache $N_1$ with users $U_1$, $U_2$, etc. If the content consulted or used by the users $U_1$ or $U_2$ cannot be found in the nanocache $N_1$, the users $U_1$ or $U_2$ are connected to a microcache $M_1$ via a non-geostationary NGSO network $R_2$ via on the one hand a non-geostationary network subscriber station $SN_1$—connected to $B_1$—and on the other hand a non-geostationary network access station $SAN_2$—connected to $M_1$, via NGSO vehicles $NG_1$. All access to content is managed by the operator of the content delivery network CDN, $CDN_1$. Where real time services are concerned, such as on-line games, for example, a user, for example $U_1$, is connected to the Internet via the access loop $B_1$, directly via the NGSO network $R_2$: the nanocache $N_2$ is then transparent.

The network comprises a regional CDN comprising a routing algorithm adapted to determine a microcache to use to find the content requested by a user that is not stored in a nanocache near the user.

The network $R_2$ of non-geostationary vehicles comprises, for example, the network access station $SAN_1$, a non-geostationary vehicle network user station $SN_1$, a vehicle $NG_1$ in low Earth orbit, comprising means adapted to exchange low-latency data between the access station $SAN_1$ and the user station $SN_1$.

A subscriber station notably enables simultaneous or successive connection to the geostationary network and a non-geostationary vehicle.

One of the functions of a regional CDN is to manage access to the geostationary satellite by the content provider stations in order to optimize the distribution of the content in a nanocache, managing access and distribution rights, at the same time as minimizing the distribution costs for the content creators. The access request sent by a content provider will be managed in accordance with known techniques for access to a subscriber station to a satellite network in random mode. At the same time as all the nanocaches, a regional CDN receives all the content transmission requests, like a subscriber to all the providers of its regional area. It also receives all the corresponding content. A regional CDN is connected to terrestrial servers. It is then possible for a regional CDN to establish a map of the nearest nanocaches and/or microcaches to access one or more contents situated on other nanocaches in a very short time.

The microcaches or macrocaches are interconnected with the subscriber stations or the access stations directly or via terrestrial networks $T_i$ as a function of the proximity or the distance of the caches from these stations and quality of service constraints.

A user may be mobile and change CDN. When a user quits a nano-CDN, a micro-CDN or a regional CDN, their content consumption profile may be shared, if they agree, in accordance with methods known to the person skilled in the art.

The content providers use VSAT type stations, for example, of small diameter, typically less than 120 cm, and of low transmission power, for example a few watts, enabling transmission of a few Mbps. These small, low-power stations are associated with solar panels, for example, which make them autonomous in terms of energy and independent of any mains electrical power supply. Each of these stations accesses a satellite placed in the region of interest using a transmission frequency chosen in the Ka band (27/30 GHz) or the Ku band (12/14 GHz), a geostationary satellite receiving these transmissions using a highly sensitive antenna having a high factor of merit and a large number of narrow beams, in contrast to classic radio broadcast satellites that use terrestrial transmission stations of very large diameter (several meters) and very high transmission power (several hundred watts).

The geostationary satellite $G_1$, FIG. 3 receives the signal including the content to be broadcast and provided by the content provider. The signal is amplified by the geostationary satellite and transmitted to the nanocache stations of the various user groups of the system that select the content to be stored as close as possible to a user. The signal is broadcast and transmitted once only, either in the Ka band (18/20 GHz), or in the Ku band (11/13 GHz). If necessary, a digital signal processor, not shown in order to simplify the figure, is positioned in the geostationary satellite and adapted to process the signals received from the content providers in order to recondition them before the change of frequency and transmission to Earth. This processing is known to the person skilled in the art and is therefore not explained here.

Figure 4:
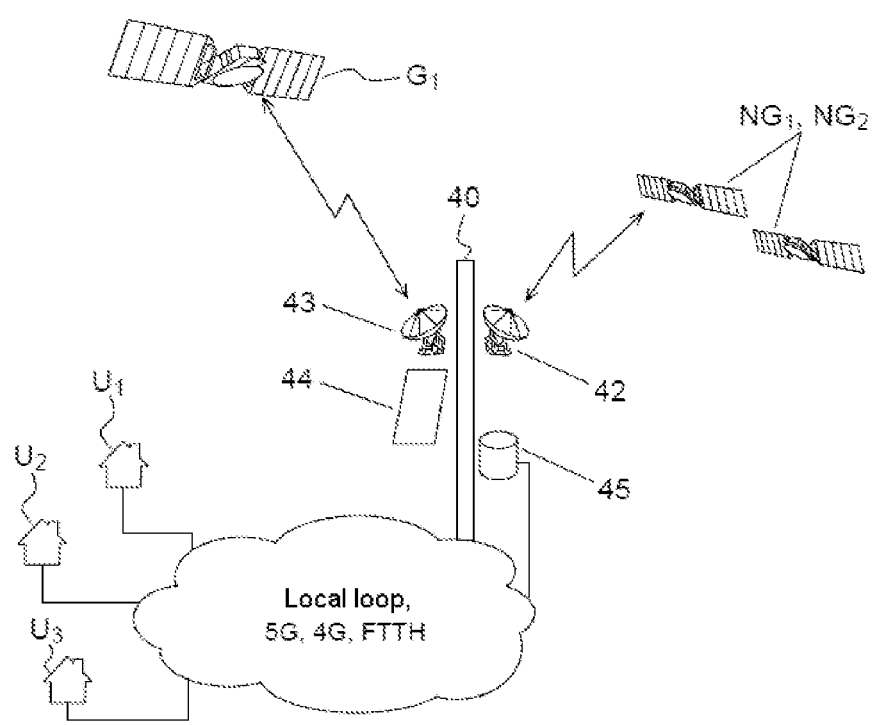
FIG. 4 is an example of implementation of the system at the user level.

FIG. 4 is an example of an architecture of a local loop to which a number of users subscribe. A plurality of users $U_i$ are connected to the satellite and non-satellite networks by a 5G, 4G, FTTH or other local loop comprising a central mast 40 equipped with a plurality of NGSO satellite terminals 42 and GEO satellite terminals 43, solar panels 44 supplying the energy required for the system to function. The central mast 40 is equipped with telecommunication modules, modulators, demodulators of the GEO and NGEO networks, storage means.

One possible example of the use of terminals is as follows:
 a subscriber station may have the two-fold function of GEO network subscriber station ($SG_2$) and NGSO network subscriber station ($SN_1$). The station may have the capability of simultaneous transmission with both networks or transmission may be successive: the GEO capacity is used only when the NGSO capacity is not used, the GEO function not taking priority.

The invention is of benefit in that nanocaches can be deployed progressively as a function of the users situated in the loop and technological evolution in storage in backing stores, the costs of which increase very rapidly. The nanocaches could have limited capacities at the outset and their capacity increased progressively. On the other hand, the microcaches placed in the infrastructure networks could be managed as storage infrastructures of very high capacity such as the data farms known at present, physically co-located, or in the form of a cloud if necessary. The difference between nanocaches and microcaches therefore resides essentially in their storage capacity and the upgrading of their storage capacity. In this context, the architecture of the proposed system therefore distributes the complexity of the management of content storage resources and the upgrading of storage capacities.

The invention may be implemented in a system based on a constellation of NGSO satellites avoiding the orbit of the GEO satellites for the purposes of spectrum sharing. This enables sharing of the same user terminal when the terminal can be pointed automatically, the GEO and NGSO modes possibly being mutually exclusive or simultaneous with two channels.

The invention finds its application in areas far from urban centres, where it is difficult to deploy fibre optic buried terrestrial networks or millimeter wireless networks for cost reasons: the user density is not high enough to hope for a sufficient return on investment. The solution using non-geostationary satellites in low Earth orbit offers transmission delays of several tens of milliseconds, comparable to those of a fibre optic network, and provides an advantageous complement to optical fibre.

The architecture in accordance with the invention offers an extension to terrestrial networks, providing access to the same services without modification of the protocols, with the same quality of service and experience for users, preserving the compatibility of the latency and security requirements. The invention also makes it possible to relieve the capacity requirement of the non-geostationary satellites, the content generally being often the same for all users. The infrastructure installed therefore offers a prospect of permanence compared to an NGSO system.

The advantage of this solution is that it offers a high capacity for growth: with local storage means, the band as perceived by users is quasi infinite because they can very quickly download a volume of very rapidly increasing richness (it suffices to increase the storage capacities by exploiting corresponding technology advances, without changing the means of transmission in the networks). The modifications are therefore local, with progressive investment as a function of the local usages of subscribers, without having to apply the same approach systematically to the entire network.

The invention claimed is:

1. A telecommunication system for the transmission of digital information between at least one content provider ($F_1$), at least one set of users ($U_i$), comprising at least the following elements:
   - a network ($R_1$) of geostationary satellites comprising at least one geostationary satellite ($G_1$), at least one access station ($SAG_1$) connected to one or more content providers ($F_1$), and at least one geostationary satellite subscriber station ($SG_1$ or $SG_2$),
   - a network ($R_2$) of non-geostationary vehicles comprising at least one network access station ($SAN_1$), at least one non-geostationary vehicle user station ($SN_1$), at least one vehicle ($NC_1$) in low earth orbit comprising means for the exchange of low-latency data between ($SAN_1$) and ($SN_1$),
   - a local loop ($B_1$) comprising a plurality of users ($U_i$),
   - a nanocache ($N_1$) connected to the subscriber station ($SG_2$) of the geostationary satellite network ($R_1$) and adapted to store content, including video data, from the content providers ($F_i$, with i at least equal to 1) as a function of a profile of the users, the nanocache ($N_1$) being also connected to the local loop ($B_1$) and to the subscriber station ($SN_1$) of the non-geostationary vehicle network ($R_2$),
   - a microcache ($M_1$) for the storage of content, including video data, from the content provider or providers ($F_1$) received via one of the subscriber station ($SG_1$) of the geostationary satellite ($G_1$), ($M_1$) being also connected to the non-geostationary network ($R_2$) via access stations ($SAN_1$), the microcache ($M_1$) having greater storage capacity than the nanocache ($N_1$), ($M_1$) storing all of the content received from the geostationary satellite ($G_1$) before delivering content to the nanocache,
   - at least one content delivery network ($CDN_1$) comprising a routing algorithm adapted to determine a microcache to be used to find the content requested by a user that is not stored in a nanocache near the user.

2. The system according to claim 1, comprising a mobility manager of users subscribed to the local loop (B1).

3. The system according to claim 1, wherein the local loop is a terrestrial access network.

4. The system according to claim 1, wherein a network of vehicles in low earth orbit is a network of non-geostationary satellites.

5. The system according to claim 1, wherein a network of vehicles in low earth orbit comprises a stratosphere balloon or a drone or a combination of non-geostationary satellites, stratosphere balloons and drones.

6. The system according to claim 1, wherein a subscriber station has only one antenna and only one modem, said antenna and said modem enabling simultaneous or successive access to a geostationary satellite and to a non-geostationary vehicle, thereby implementing the ($SG_2$) and ($SN_1$) function.

7. The system according to claim 3, wherein a subscriber station has only one antenna and only one modem, said antenna and said modem enabling simultaneous or successive access to a geostationary satellite and to a non-geostationary vehicle, thereby implementing the ($SG_2$) and ($SN_1$) function.

8. The system according to claim 5, wherein a subscriber station has only one antenna and only one modem, said antenna and said modem enabling simultaneous or successive access to a geostationary satellite and to a non-geostationary vehicle, thereby implementing the ($SG_2$) and ($SN_1$) function.

9. The system according to claim 1, wherein the geostationary and non-geostationary networks operate in the same frequency bands in accordance with mutual protection principles.

10. The system according to claim 4, wherein the geostationary and non-geostationary networks operate in the same frequency bands in accordance with mutual protection principles.

11. The system according to claim 6, wherein the geostationary and non-geostationary networks operate in the same frequency bands in accordance with mutual protection principles.

12. The system according to claim 1, wherein a user is connected to the networks via a WiFi local loop ($B_1$) comprising a central mast equipped with a plurality of non-geostationary subscriber terminals and geostationary subscriber terminals and solar panels.

13. The system of claim 12, wherein the at least one vehicle ($NG_1$) in low earth orbit includes a drone.

14. The system of claim 12, wherein the at least one vehicle ($NG_1$) in low earth orbit includes a non-geostationary satellite.

15. The system of claim 12, wherein the at least one vehicle ($NG_1$) in low earth orbit includes a stratosphere balloon.

16. The system of claim 1, wherein the video data includes on-demand videos.

17. The system of claim 1, wherein the video data includes sporting events.

18. The system of claim 1, wherein the video data includes mass market video programs.

19. The system of claim 1, wherein the video data includes locally adapted advertising sequences.

* * * * *